Figure 1:
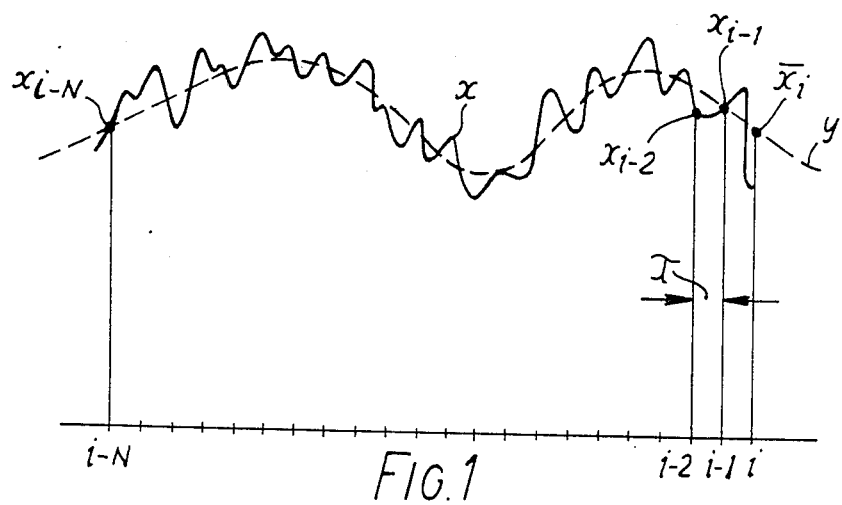

United States Patent [19]

Watts

[11] Patent Number: 4,780,720

[45] Date of Patent: Oct. 25, 1988

[54] RADAR APPARATUS

[75] Inventor: Simon Watts, Kingston Upon Thames, England

[73] Assignee: EMI Limited, Hayes, England

[21] Appl. No.: 438,034

[22] Filed: Sep. 30, 1982

[30] Foreign Application Priority Data

Oct. 28, 1981 [GB] United Kingdom ............ 8132442

[51] Int. Cl.$^4$ ............................................. G01S 13/00
[52] U.S. Cl. ...................................... 342/91; 342/160
[58] Field of Search ............... 343/5 CF; 342/91, 160, 342/93, 92, 159, 89, 90, 94, 95, 162, 189, 195

[56] References Cited

U.S. PATENT DOCUMENTS

| | | | |
|---|---|---|---|
| 3,701,149 | 10/1972 | Patton et al. | 343/5 CF X |
| 3,797,014 | 3/1974 | Tompkins et al. | 343/5 CF X |
| 4,117,538 | 9/1978 | Shrader et al. | 343/5 VQ X |
| 4,159,477 | 6/1979 | Le Beyec | 343/5 CF X |
| 4,242,682 | 12/1980 | Musha et al. | 343/5 CF X |
| 4,318,101 | 3/1982 | Musha et al. | 343/5 CF |
| 4,386,353 | 5/1983 | Bleijerveld et al. | 343/5 CF X |
| 4,488,154 | 12/1984 | Ward | 343/5 CF X |

OTHER PUBLICATIONS

R. Benjamin—"Generalisations of Maximum-Entropy Pattern Analysis", *IIE Proc.*, vol. 127, Pt. F. No. 5, Oct. 1980, pp. 341–353.

*Primary Examiner*—Thomas H. Tarcza
*Assistant Examiner*—John B. Sotomayor
*Attorney, Agent, or Firm*—Fleit, Jacobson, Cohn & Price

[57] ABSTRACT

A circuit for generating an output signal $\overline{L}$ indicative of the mean clutter level at a selected location in the field of view of a radar apparatus, particularly the sea surface which exhibits a swell pattern. The circuit includes processing circuits which generate weighting coefficients ($a_1, a_2, \ldots a_N$) used to weight the amplitudes of returns derived respectively from a group of N discrete locations which precede in range and or succeed in range the selected location. The circuit generates the elements r(n) of a matrix [r] which represents the auto correlation function of the amplitude of returns derived from w discrete locations encompassing the group of N locations. Circuit then uses the matrix [r] to compute the weighting coefficients ($a_1, a_2 \ldots a_N$) which are stored at 13 applied to respective multiplying circuits to weight corresponding amplitudes accessed to respective locations of a shift register. The weighted amplitudes are averaged at to generate the signal $\overline{L}$, indicative of the means clutter level. A threshold value, related to the mean level $\overline{L}$ is then compared at 18 with the amplitude of a return actually observed at the selected location. If the observed value exceeds the threshold then a target is declared.

15 Claims, 3 Drawing Sheets

RADAR APPARATUS

This invention relates to radar systems used to detect objects against a background of clutter, especially sea clutter.

Radar systems are often used to detect objects e.g. ships against a background of clutter e.g. backscatter from the sea surface. It is often required to provide for reliable detection of targets whilst maintaining a constant false alarm rate (CFAR). Hitherto, a running average detector (RAD) approach has commonly been used whereby the mean clutter level at a selected location in the field of view is estimated by averaging a number of independent range samples. This is achieved by averaging radar returns, generated in response to a transmitted pulse, and indicative of the clutter level at a number of different locations within the vicinity of a selected location. An object can then be detected if the level of signals actually returned from the selected location exceeds that of a threshold signal set at a level somewhat higher than the estimated mean level and designed to give the desired probability of false alarm. Such a system can approach CFAR operation if the RAD provides a sufficiently accurate estimate of mean clutter value and if the clutter distribution can be described by the mean level, as in a Rayleigh distribution, for example.

The above-described approach assumes that the local mean clutter level remains constant over a range interval large enough to permit averaging over a sufficient number of range samples, and can prove unreliable if the mean clutter level fluctuates in range, as can occur for example, when the sea surface exhibits a swell pattern which is resolved by the radar in range. In these circumstances, it is possible that the threshold level may be set at too high or too low a level, and this may respectively result in an object remaining undetected or in an excessively high false alarm rate due to the detection of clutter rather than genuine objects of interest.

It is an object of this invention, therefore, to provide an improved detection circuit and apparatus.

According to one aspect of the invention there is provided a circuit for generating an output signal indicative of the clutter level at a selected location in the field of view of a radar apparatus comprising means for sampling a plurality of returns, produced in response to a transmitted radar pulse and emanating from a corresponding plurality of discrete locations which are spaced apart evenly and precede, in range, and or succeed, in range, the selected location, processing means for weighting at least some of said returns by respective amounts related to a variation, as a function of range of the amplitudes of all said returns and means for utilising the weighted returns to generate the output signal.

In a preferred embodiment returns may be weighted by amounts related to the autocorrelation function of all the returns.

According to another aspect of the invention there is provided a radar apparatus comprising means for transmitting a radar pulse and receiving corresponding returns, a circuit according to said one aspect of the present invention for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

Figure 2:
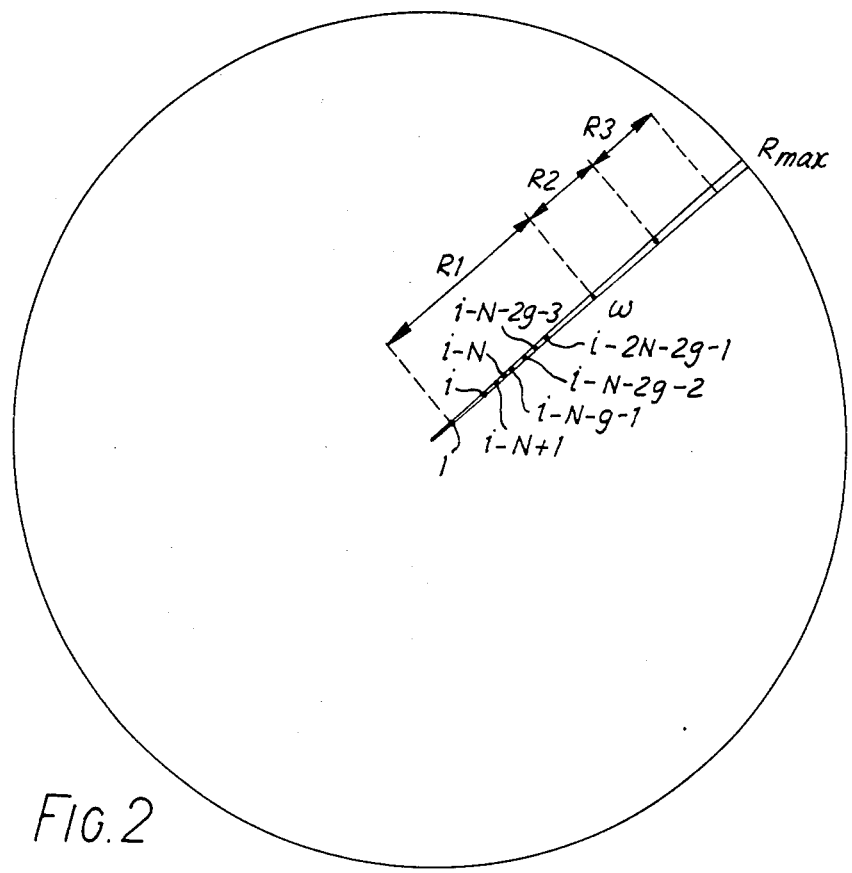
Figure 3:
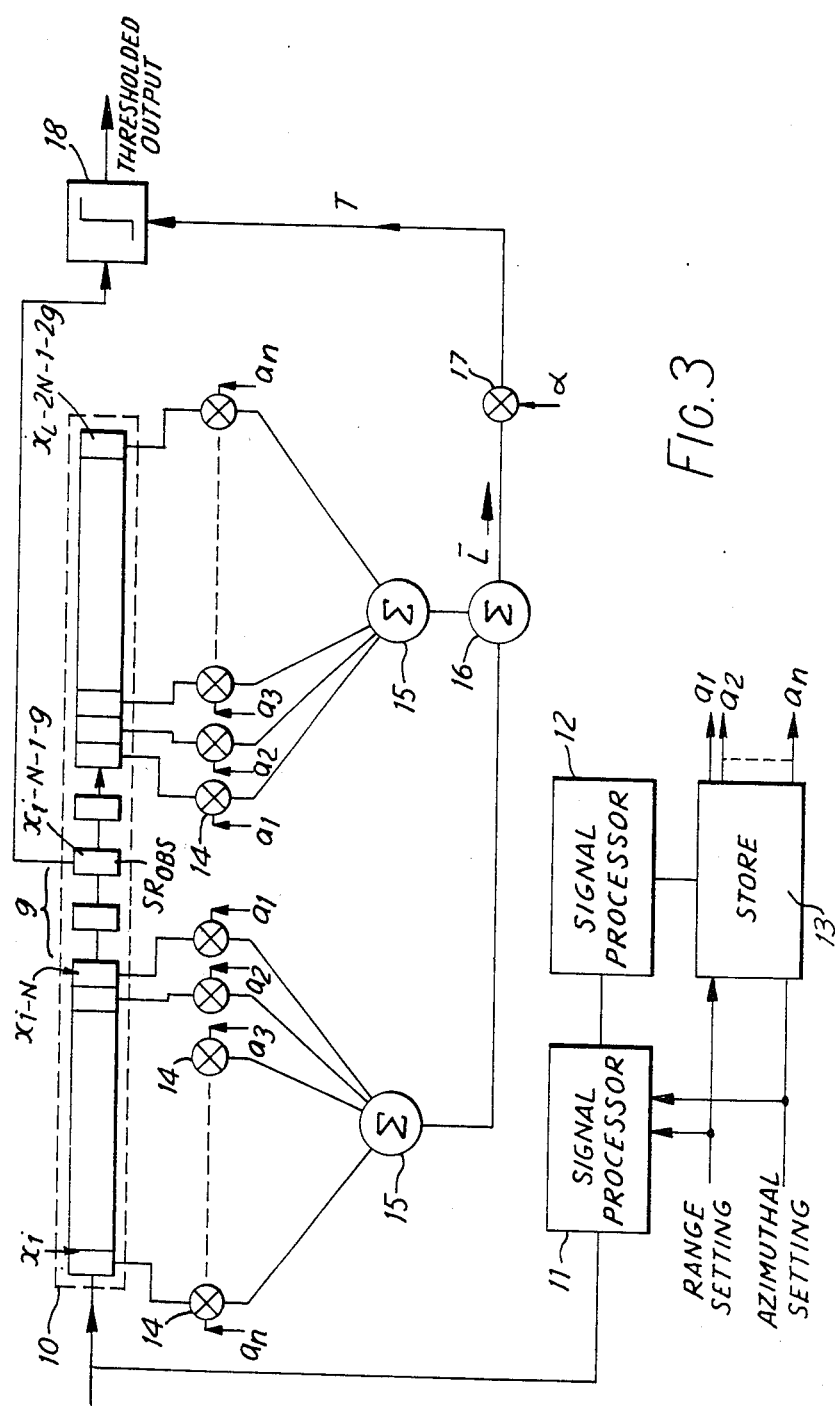
Figure 4:
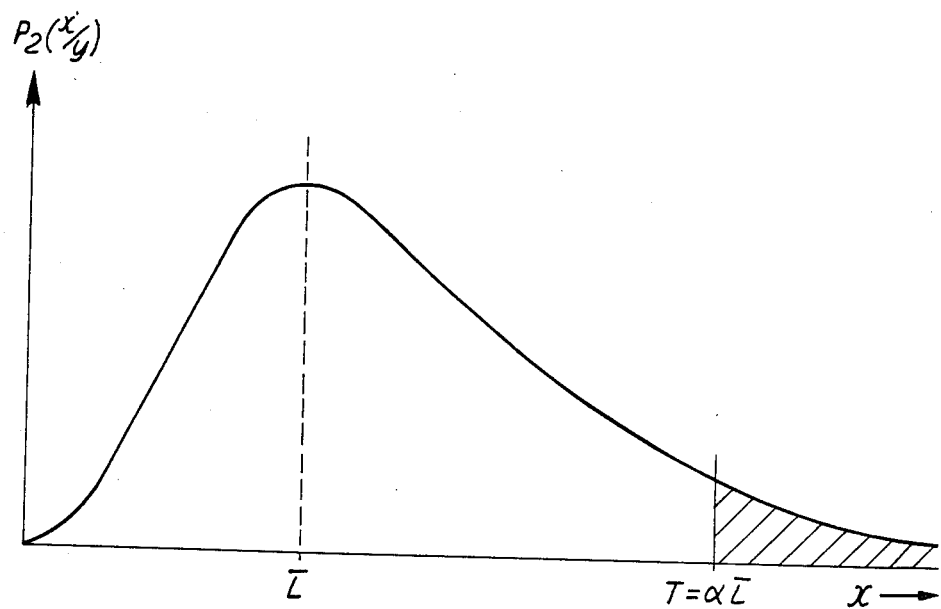

In order that the invention may be more readily understood and carried into effect an embodiment thereof is now described, by way of example only, by reference to the accompanying drawings of which:

FIG. 1 illustrates, in schematic form, the actual and mean clutter levels prevailing in a section of the sea surface, FIG. 2 illustrates the field of view of an aximuthally scanned radar system, FIG. 3 shows a circuit for identifying a target at a selected location in the field of view of the radar system and FIG. 4 illustrates the setting of a threshold level.

As described earlier, it is often found in practice that the local mean clutter level is not constant, but tends to fluctuate in range due to the swell pattern of the sea surface. The variation with range of the mean clutter level, y, is illustrated (on an arbitrary scale) by the dashed line curve of FIG. 1, the solid line representing the variation in the clutter level, x, which is actually observed with returns from individual pulses. In these circumstances, the amplitude probability distribution $p(x)$ of the entire clutter population can be expressed as $$p(x) = \int p_1(y) p_2(x/y) \, dy,$$

namely a superposition of the amplitude probability distribution $p_1(y)$ of the local mean clutter level y (due to the sea swell) and the distribution $P_2(x/y)$ of the observed clutter level x, assuming the mean level to have the value y. Hitherto, it has sometimes proved difficult to derive a reliable estimate of the local mean clutter level y since its value tends to be constant over an interval in range which is too small to permit averaging over a sufficient number of data measurements and, as described earlier, this can lead to the setting of a threshold level which is either too high or too low.

The inventor has discovered that a reliable estimate of the local means clutter level at a selected location (at the position i in FIG. 1, say) can still be derived, even in conditions when the mean level fluctuates in range, and that this can be achieved by appropriately weighting the clutter levels observed prior to averaging at discrete locations preceding and or succeeding the selected location. In the illustrated example, therefrom, the clutter level x may be sampled at N discrete positions spaced apart in range by an amount $\tau$, the levels $x_{i-N}$ to $x_{i-1}$ observed at these locations being used to derived an estimate of the mean clutter level at the location i.

Practical results have shown that the auto-correlation function of the range returns exhibits fluctuations corresponding to the swell pattern of the sea surface. The approach used in this invention is based on "Burg's Maximum Entropy method" (see for example a paper by R.Benjamin IEE Proc. 127F p341-353) which states that a signal sample x(i) can be predicted, within an error e(i) by a linear combination of N preceeding (and or succeeding) samples $x(i-1)$ to $x(i-N)$ and thus:

$$e(i) = a(o)x(i) + a(i-2) \ldots a(n) \times (i-N)$$

where a(o), a(1) . . . a(N) are weighting coefficients.

It is possible to set a(o) to 1 and to choose the remaining coefficients a(1) . . . a(N) so that the error e(i) is minimised, and in these circumstances the predicted means clutter level x(i) is given by a linear combination of the observed levels $x(i-1) \ldots x(i-N)$ weighted by appropriate coefficients $a(1) \ldots a(N)$. It can be shown that the coefficients $a(1) \ldots a(N)$ can be calculated from the elements $r(n)$ of the autocorrelation function derived from observed signal levels, $x(1)$ to $x(w)$ which may include $x(i-1) \ldots x(i-n)$ $$r(n) = \sum_{k=1}^{w-n} \frac{x(k) x(k+n)}{w-n} \text{ for } n = 0,1 \ldots N, \text{ for } N < w/2 \quad \text{Equation (1)}$$

and this can be written in matrix form as $$[r]\underline{a} = \underline{r} \text{ i.e.} \quad \text{Equation (2)}$$

$$\begin{pmatrix} r(0) & \ldots & r(N-1) \\ r(1) \, r(0) & & r(N-2) \\ \cdot & & \cdot \\ \cdot & & \cdot \\ r(N-1) & \ldots & r(0) \end{pmatrix} \begin{pmatrix} a(1) \\ a(2) \\ \cdot \\ \cdot \\ a(N) \end{pmatrix} = \begin{pmatrix} r(1) \\ r(2) \\ \cdot \\ \cdot \\ r(N) \end{pmatrix} \text{ or}$$

$$\underline{a} = [r]^{-1}\underline{r}$$

By solving Equation 2, therefore, it is possible to derive the weighting coefficients $a(1) \ldots a(N)$ which can then be applied to the corresponding observed signal levels $x(i-1) \ldots x(i-N)$ to thereby determine the local mean clutter level at the position i.

It will be appreciated that the signals $x(i-1) \ldots x(i-N)$ are subject to a background "noise" superimposed upon the mean clutter level (indicative of the pattern of sea swell) in accordance with the probability distribution function $p\,(x/y)$, described hereinbefore.

The previous analysis considered only the returns from a single pulse. If the radar changes its frequency from pulse to pulse (frequency agility) it has been found experimentally that the underlying mean level y remains constant but that the returns at a particular range are decorrelated and represented by independent samples from the distribution $p\,(x/y)$. A more reliable estimate of the required autocorrelation function may therefore be obtained by averaging the separate auto correlation functions obtained from returns over several successive frequency agile pulses.

In the example given so far the weights $a(i) \ldots a(n)$ are designed to give best estimate of $x(i)$ based on samples $x\,(i-1) \ldots x\,(i-N)$. In general it may be desirable to leave a gap between $x(i)$ and the samples used to estimate its mean level so that any target in $x(i)$ will not influence the estimate. Typically this gap g will be sufficient to ensure that $x(i)$ and $x(i-1-g)$ are separated by at least a radar pulse length (assuming detection of a target which is substantially less extensive in range than one pulse length).

In general for a gap of g samples the best estimate for the weights $a(i)$ will be given by:

$$\begin{pmatrix} r(0) & \ldots & r(N-1) \\ r(1) \, r(0) & & r(N-2) \\ \cdot & & \cdot \\ \cdot & & \cdot \\ r(N-1) & \ldots & r(0) \end{pmatrix} \begin{pmatrix} a(1) \\ \cdot \\ \cdot \\ \cdot \\ a(N) \end{pmatrix} = \begin{pmatrix} r(1+g) \\ \cdot \\ \cdot \\ \cdot \\ r(N+g) \end{pmatrix}$$

The procedures described hitherto have required calculation of the autocorrelation function $r(n)$. In an alternative approach, however, this proves to be unnecessary, the vector of weighting functions $A(k+1)\square[a(1) \ldots a(N)]^T$ derived in respect to the $k+1^{th}$ selected position being generated by iteration from the vector $A(k)$ derived in respect of the preceeding selected position, k. This is achieved by minimizing the prediction error $[x(k)-\hat{x}(k)]$ contained within the iteration algorithm $$A(k+1)=A(k)+\mu[(x(k)-\hat{x}(k)]X(k)]X(k-1), \quad \text{Equation (3)}$$

where X(k-1) is a vector of the N data samples $[x(k-1), x(k-2) \ldots x(k-N)]^T$ observed at positions preceding the $k^{th}$ position, (k) is the clutter level measured at the $k^{th}$ position and $\hat{x}(k)$ is the predicted clutter level at the $k^{th}$ position, determined by applying the vector $A(k)$ to the data samples $[x(k-1) \ldots x(k-N)]^T$. The convergence property of the algorithm is controlled by a scalar $\mu$. By adjusting the elements of the vector $A(k)$, therefore, it is possible to minimize the prediction error iteratively to derive a new vector $A(k+1)$ at the $k+1^{th}$ position.

Iteration can be initiated by setting $a(1), \ldots a(N)$ all to 1/N. Alternatively, for faster convergence, $a(1) \ldots a(N)$ can be estimated initially by applying the autocorrelation technique described hereinbefore.

Using this method it is desirable that the data samples should exhibit stationary statistics (in the sense that range autocorrelation function remains unchanged) for a time interval which is at least as large as the convergence time of the algorithm.

An arrangement for implementing the above-described technique will now be described by reference to FIGS. 2, 3 and 4 of the drawings. As illustrated in FIG. 2, the radar used in this example generates a beam B which "illuminates" a narrow sector in the field of view, extending to a range $R_{max}$ (typically many miles) and is scanned repetitively in azimuth to sweep out a circular track. It will be appreciated, however, that the present invention could be applied to other kinds of radar system also, an unscanned system for example.

In this example of the invention, the local mean clutter level is to be estimated at the position i-N-g-1 and for the purpose the actual clutter level is sampled at 2N discrete locations, i $\ldots$ i-N and i-N-2g-2 $\ldots$ i-2N-2g-1, which respectively succeed and precede the selected position i-N-g-1 in range. The clutter levels measured at these sampled locations are respectively $x_i \ldots x_{i-N}$ and $x_{i-N-1-g} \ldots x_{i-2N-1-2g}$. Referring now to FIG. 3, the returns emanating from the locations i $\ldots$ i-2N-1-2g, generated in response to a transmitted pulse i are received successively by, and clocked into successive storage locations of, a shift register 10. Returns from a wider range interval spanning locations 1 $\ldots$ w and including the locations 1 $\ldots$ i-2N-l-2g are also passed to a signal processor 11 which is arranged to utilize the signals emanating from the locations, to compute the elements r(n) of the autocorrelation function r, as described hereinbefore. Typically, the processor 11 is a microprocessor which is programmed to compute the summations specified by Equation (1). These elements, constituting the matrix r, are then passed to a further processor 12, which, in this example is a further processor programmed to solve the matrix equation (2), to generate the weighting coefficients a(1), a(2) ... a(N) for application to respective measured data samples x(i) ... x(i-N-1) and x(i-N-2-2g) ... x(i-2N-1-2g). The weighting coefficients are then passed to a store 13 until required for further use.

In an alternative embodiment of the invention, the processors 11 and 12 are replaced by a single processor, programmed to compute the weighting coefficients a(1), a(3) ... a(N), i.e. A(k+1), in accordance with the iteration algorithm of Equation (3).

The storage locations of the shift register 10, used to store data samples derived from locations both preceding and succeeding in range the selected location, i-N-1-g, have respective outputs, each coupled to a multiplying circuit 14. The data samples prevailing in these storage locations are thereby weighted by respective amounts a(1), a(2) ... a(n), each accessed to a corresponding multiplying circuit 14 from the store 13, as shown in FIG. 3. The two groups of weighted samples are then summed by an adding circuit 15 and the sums averaged at 16 to generate a signal $\bar{L}$ of a magnitude indicative of the mean clutter level at the i-N-g-1$^{the}$ position. This signal is then multiplied at 17 by a further factor $\alpha$ to set a threshold at a level $T(=\alpha\bar{L})$.

The value $\alpha$ may be estimated in relation to the distribution function $p_2(x/y)$ of the clutter level x about the mean level y i.e. $\bar{L}$ in this case. Typically $p_2(x/y)$ is assumed to follow a Rayleigh distribution so that $$p_2(x/y) = \pi/2(x/y^2)e\{-\pi/4(x^2/y^2)\}$$

In these circumstances, as illustrated in FIG. 4, the threshold level T is set at a level higher than the mean level $\bar{L}$ so that the probability of the threshold being exceeded by relatively high clutter levels is relatively small. This probability is represented by the shaded area under the curve $p_2(x/y)$ and results in a relatively low, constant "false alarm" rate.

The signal level actually observed at the location i-N-1-g is then accessed from the location SR$_{obs}$ of the shift register 10 to a comparator 18 for comparison with the threshold level T, and an object is assumed to have been identified if signals are generated thereby.

Once weighting coefficients a(1), a(2)...a(N) have been generated by applying Equation 1 above to returns derived from discrete locations (1 ... w) spanning a range interval R1 for which the autocorrelation function r (N) is stationary, then these same weighting coefficients can be used to estimate the mean clutter level in respect of each location within the range interval R1 as the "window" presented by the RAD (2N+2g+1 locations wide, in this example) moves in range along the same azimuthal setting. New autocorrelation functions and their corresponding weighting coefficients are then generated in respect of different range intervals R2, R3 etc. Alternatively, or in addition, the weighting coefficients derived in respect of a particular range interval R1, R2, R3 etc. for a particular azimuthal setting can be used in respect of other neighboring azimuthal settings to an extent commensurate with a stationary autocorrelation function.

The weighting functions derived during a particular scan of the radar system may be stored at 13 and used during many successive scans of the system. From time to time, however, as the sea state changes, it will be necessary to update the value of the weighting coefficients.

It will be appreciated that although the above described example relates to a double sided system in which data samples both precede and succeed the selected location in range, a single sided system could alternatively be used in which the samples either precede or succeed the selected location.

What I claim is:

1. A circuit for generating an output signal indicative of the clutter level at a selected location in the field of view of a radar apparatus comprising:

means for sampling a plurality of returns, produced in response to a transmitted radar pulse and emanating from a corresponding plurality of discrete locations which are spaced apart evenly and precede, in range, and or succeed, in range, the selected location; and processing means for applying a respective weighting to each one of at least some of said plurality of returns, each respective weighting being derived from, and relates to, a variation, as a function of range, of the amplitudes of all said returns and means for utilizing the weighted returns to generate said output signal.

2. A circuit according to claim 1 wherein the sampling means is arranged to sample returns derived from discrete locations, each spaced from the selected location by a distance exceeding the width of the transmitted radar pulse.

3. A radar apparatus comprising means for transmitting a radar pulse and receiving corresponding returns, a circuit according to any one of claims 1 and 2 for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

4. A radar apparatus according to claim 3 including means for setting a threshold at value related to a Rayleigh distribution of clutter levels about the clutter level indicated by the output signal.

5. A circuit according to claim 1 wherein said processing means is conditioned to evaluate the autocorrelation function of the amplitudes of all said returns and to derive said weighting amounts from the autocorrelation function.

6. A circuit for generating an output signal indicative of the clutter level at a selected location in the field of view of a radar apparatus, the circuit comprising:

means for sampling a plurality of returns produced in response to a transmitted radar pulse and emanating from a corresponding plurality (w) of discrete locations which are spaced apart evenly and precede, in range, and or succeed, in range, the selected location;

processing means for applying a respective weighting coefficient a(1), a(2)...a(N), related to the autocorrelation of all said returns, to each one of at least some of said returns;

and means for utilizing the weighted returns to generate the output signal, wherein said processing means comprises means for processing returns for w discrete locations to generate the elements, r(n), of said autocorrelation function where $$r(n) = \sum_{k=1}^{w-n} \frac{x(k) x(k+n)}{w-n}$$

and x(k) is the amplitude of the $k^{th}$ return
x(k+n) is the amplitude of the $(k+n)^{th}$ return and n=0, 1, 2 ... for N w/2, means for solving the matrix equation given by $$\begin{pmatrix} r(0) & r(1) & & r(N-1) \\ r(1) & r(0) & & r(N-2) \\ \cdot & & & \cdot \\ \cdot & & & \cdot \\ \cdot & & & \cdot \\ r(N-1) & \ldots & & r(0) \end{pmatrix} \begin{pmatrix} a(1) \\ a(2) \\ \cdot \\ \cdot \\ \cdot \\ a(N) \end{pmatrix} = \begin{pmatrix} r(1) \\ r(2) \\ \cdot \\ \cdot \\ \cdot \\ r(N) \end{pmatrix}$$

to generate weighting coefficients a(1), a(2)... a(N), and means for weighting the amplitudes x(1), x(2) ... x(N), of returns derived from N discrete locations, by respective coefficients a(1), a(2) ... a(N).

7. A circuit according to claim 6 wherein the sampling means is arranged to sample returns derived from discrete locations, each spaced from the selected location by a distance exceeding the width of the transmitted radar pulse.

8. A radar apparatus comprising means for transmitting a radar pulse and receiving corresponding returns, a circuit according to claim 6 for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

9. A radar apparatus comprising means for transmitting a radar pulse and receiving corresponding returns, a circuit according to claim 7 for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

10. A radar apparatus according to claim 8 including means for setting a threshold at value related to a Rayleigh distribution of clutter levels about the clutter level indicated by the output signal.

11. A circuit for generating an output signal indicative of the clutter level at a selected location in the field of a view of a radar apparatus, the circuit comprising:

means for sampling a plurality of returns produced in response to a transmitted radar pulse and emanating from a corresponding plurality (w) of discrete locations which are spaced apart evenly and precede, in range, and or succeed, in range, the selected location, processing means for applying a respective weighting to each one of at least some of said returns; and means for utilizing the weighted returns to generate the output signal, wherein said processing means comprises means for generating a vector A(k+1) of N weighting coefficients by minimizing the prediction error [x(k)− (k)] in the interation algorithm $$A(k+1)=A(k)+\mu[(x(k) -\hat{x}(k)]X(-1)$$

where X(k−1), is a vector comprising the amplitude, x(x−1), x(k−2) ... x(k−N), of returns derived from locations k−1, k−2 ... k−N, $\mu$ is a scalar, x(k) is the amplitude of a return derived from location k, (k) is the predicted amplitude of a return derived from location k obtained by weighting the components of vector X(k−1) by respective weighting coefficients constituting the vector A(k), and means for weighting the amplitudes x(k), x(k-1), x(k+1−N) of returns derived respectively from locations k, k−1 ... k+1−N by respective weighting coefficients constituting said vector A(k+1).

12. A circuit according to claim 11 wherein the sampling means is arranged to sample returns derived from discrete locations, each spaced from the selected location by a distance exceeding the width of the transmitted radar pulse.

13. A radar apparatus comprising means for transmitting a radar pulse and receiving corresponding returns, a circuit according to claim 11 for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

14. A radar apparatus comprising means for transmitting a radar pulse and receiving corresponding returns, a circuit according to claim 12 for generating an output signal indicative of the clutter level at a selected location in the field of view of the apparatus and means for comparing the amplitude of a return, actually derived from said selected location, with a threshold value related to said output signal, and means for producing an indication of a target in dependence on the comparison.

15. A radar apparatus according to claim 13 including means for setting a threshold at value related to a Rayleigh distribution of clutter levels about the clutter level indicated by the output signal.

* * * * *